United States Patent
Yun et al.

(10) Patent No.: US 7,924,667 B2
(45) Date of Patent: Apr. 12, 2011

(54) RECORDING AND/OR REPRODUCING APPARATUS, MEDIUM, AND METHOD CONTROLLING A WRITE SPEED

(75) Inventors: Kun-ho Yun, Seoul (KR); Jong-tae An, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 1271 days.

(21) Appl. No.: 11/362,910

(22) Filed: Feb. 28, 2006

(65) Prior Publication Data
US 2006/0215509 A1 Sep. 28, 2006

(30) Foreign Application Priority Data
Mar. 25, 2005 (KR) .................. 10-2005-0024957

(51) Int. Cl.
*G11B 7/00* (2006.01)
(52) U.S. Cl. ............. 369/47.4; 369/47.38; 369/53.38
(58) Field of Classification Search ............ 369/47.4, 369/47.38
See application file for complete search history.

(56) References Cited

U.S. PATENT DOCUMENTS
| | | | | |
|---|---|---|---|---|
| 6,014,726 | A * | 1/2000 | Obata et al. ............. | 711/111 |
| 7,006,419 | B2 * | 2/2006 | Yokoi ..................... | 369/59.11 |
| 2002/0039335 | A1 * | 4/2002 | Masaki et al. .......... | 369/53.14 |
| 2002/0131350 | A1 * | 9/2002 | Kurobe et al. .......... | 369/47.4 |
| 2002/0181365 | A1 * | 12/2002 | Nakajo ................... | 369/47.53 |
| 2003/0165094 | A1 * | 9/2003 | Tseng et al. ............ | 369/47.3 |
| 2005/0030862 | A1 * | 2/2005 | Ninomiya .............. | 369/47.53 |
| 2006/0245332 | A1 * | 11/2006 | Shen et al. ............. | 369/94 |

FOREIGN PATENT DOCUMENTS
| | | |
|---|---|---|
| JP | 2002-279635 | 9/2002 |
| JP | 2004-199749 | 7/2004 |
| KR | 2003-0073241 | 9/2003 |
| KR | 10-2004-00665 61 | 7/2004 |
| KR | 10-2004-0066654 | 7/2004 |
| KR | 10-2004-0072073 | 8/2004 |
| KR | 10-2004-0090539 | 10/2004 |
| KR | 10-2004-0096334 | 11/2004 |

OTHER PUBLICATIONS
Korean Office Action issued Jun. 28, 2006, in related Korean Patent Application No. 10-2005-0024957.

* cited by examiner

*Primary Examiner* — Lixi Chow
(74) *Attorney, Agent, or Firm* — NSIP Law

(57) ABSTRACT

A recording and/or reproducing apparatus, medium, and method controlling a write speed of a disk drive. The method may includes measuring a predetermined disk quality evaluating factor affecting a servo control performance in multiple areas of a disk, determining an optimal write speed of the areas of the disk corresponding to the disk quality evaluating factor, and controlling a rotation speed of the disk at an optimal write speed of a corresponding area of the disk, depending on a position of the disk in which writing is to be performed, in a writing mode.

28 Claims, 6 Drawing Sheets

RECORDING AND/OR REPRODUCING APPARATUS, MEDIUM, AND METHOD CONTROLLING A WRITE SPEED

CROSS-REFERENCE TO RELATED APPLICATIONS

Embodiments of this application claim the priority benefit of Korean Patent Application No. 10-2005-0024957, filed on Mar. 25, 2005, in the Korean Intellectual Property Office, the disclosure of which is incorporated herein in its entirety by reference.

BACKGROUND OF THE INVENTION

1. Field of the Invention

Embodiments of the present invention, at least as discussed herein, relate to a recording and/or reproducing apparatus, medium, and method controlling a servo, and more particularly, to an apparatus, medium, and method for controlling a write speed to vary the write speed based on a quality of areas of the disk drive.

2. Description of the Related Art

Methods for controlling the rotation speed of a disk in a disk drive may be classified into a constant linear velocity (CLV) controlling method and a constant angular velocity (CAV) controlling method.

In the CLV controlling method, a pickup uniformly maintains a linear velocity for tracking tracks, write and playback speeds are the same along inner and/or outer perimeters of a disk, and a revolution per minute (RPM) of a spindle motor rotating the disk is greatest along the inner perimeter of the disk and becomes reduced toward the outer perimeter.

In the CAV controlling method, the rotation angular velocity is uniformly maintained, an RPM of a spindle motor is maintained constant regardless of inner and outer perimeters of a disk, and the difference between write and playback speeds occurs along the inner and/or outer perimeters of the disk.

According to these conventional techniques, writing is performed at a relatively low speed along an inner perimeter of a disk but at a maximum speed at an outer perimeter of the disk, due to the above-described characteristics. In particular, in a disk drive into which a multilayer disk, for example, is loaded, a write speed is lowered only at the inner perimeter of the disk, as shown in FIGS. 1A and 1B, to improve the performance a spindle motor and to solve problems caused by noise generated by the spindle motor.

In general, if a disk is bent or an eccentricity exists between a central axis of a spindle motor and a central axis of a disk, the eccentricity has a bad effect on the write quality at an outer perimeter of the disk, while not having the same effect at an inner perimeter. Further, in the case of a multilayer disk, the write quality is temporarily deteriorated even when jumping between layers.

However, in the conventional techniques, to avoid these problems, the write speed is lowered only at an inner perimeter area of a disk while uniformly maintained in other areas of the disk, regardless of the quality of the disk. Thus, with this compensation, the write quality is deteriorated along an outer perimeter area of the disk due to the quality of the disk. In addition, in the case of a multilayer disk, the write quality is also greatly deteriorated during jumping between layers.

SUMMARY OF THE INVENTION

Embodiments of the present invention set forth an apparatus, medium, and method controlling a write speed of a disk drive to adaptively vary the write speed depending on a writing position of the disk in consideration of a quality of each area of the disk, and particularly, to lower the write speed during jumping of a layer on a multilayer disk.

To achieve the above and/or other aspects and advantages, embodiments of the present invention include a method for controlling a write speed of a recording and/or reproducing apparatus, including measuring a medium quality evaluating factor affecting a servo control performance in a plurality of areas of a medium, determining respective optimal write speeds for the plurality of areas of the medium based on a respective medium quality evaluating factor, and controlling, in a writing mode, a rotation speed of the medium at an optimal write speed, from the determined optimal write speeds, for a corresponding area, of the plurality of areas, of the medium to which writing is to be performed.

The respective optimal write speeds may be determined irrespective of a corresponding standard write speed for the medium determined during a design/manufacturing stage or outside of the writing mode of the recording and/or reproducing apparatus.

The respective optical write speeds may be determinable to be greater than a corresponding standard write speed for the medium determined during a design/manufacturing stage or outside of the writing mode of the recording and/or reproducing apparatus.

Further, the respective optical write speeds may be determinable to be lower than a corresponding standard write speed, along an outer perimeter of the medium, with the standard write speed being determined during a design/manufacturing stage or outside of the writing mode of the recording and/or reproducing apparatus.

The respective optical write speeds may be determinable to be different than a corresponding standard write speed, in an area of layer change during the writing mode, with the standard write speed being determined during a design/manufacturing stage or outside of the writing mode of the recording and/or reproducing apparatus.

In addition, the medium quality evaluating factor may be based on at least one of a magnitude of a tracking error signal, a magnitude of a focus error signal, and a variation in a magnitude of a wobble signal.

If a measured value of the medium quality evaluating factor is within upper and lower threshold values, a standard write speed, determined during a design/manufacturing stage or outside of the writing mode of the recording and/or reproducing apparatus, may be maintained as a corresponding optimal write speed, if the measured value of the medium quality evaluating factor is above the upper threshold value then the optimal write speed in the corresponding area may be determined so as to be lower than the standard write speed, and if the measured value of the medium quality evaluating factor is lower than the lower threshold value then the optimal write speed in the corresponding area may be determined so as to be greater than the standard write speed, wherein the measured value of the medium quality evaluating factor is representative of larger values tending toward greater potentiality of writing errors and lower values tending toward lower potentiality of writing errors.

Similarly, if a measured value of the medium quality evaluating factor is within upper and lower threshold values, a standard write speed, determined during a design/manufacturing stage or outside of the writing mode of the recording and/or reproducing apparatus, may be maintained as a corresponding optimal write speed, if the measured value of the medium quality evaluating factor is above the upper threshold value then the optimal write speed in the corresponding area may be determined so as to be higher than the standard write speed, and if the measured value of the medium quality evaluating factor is lower than the lower threshold value then the optimal write speed in the corresponding area may be determined so as to be lower than the standard write speed, wherein the measured value of the medium quality evaluating factor is representative of larger values tending toward lower potentiality of writing errors and lower values tending toward greater potentiality of writing errors.

If the medium is a multilayer disk, a corresponding optical write speed in an area in which layer jumping is executed may be determined so as to be lower than a standard write speed, determined during a design/manufacturing stage or outside of the writing mode of the recording and/or reproducing apparatus, by a predetermined write speed.

Further, if the medium is a multilayer disk, corresponding optimal write speeds for innermost and outermost perimeter areas of the medium may be determined so as to be lower than a standard write speed, determined during a design/manufacturing stage or outside of the writing mode of the recording and/or reproducing apparatus, by a predetermined write speed, and corresponding optimal write speeds in other areas of the disk are optimally determined based on the medium quality evaluating factor.

The rotation speed of the medium may be controlled using a zone-constant linear velocity controlling method. Further, the rotation speed of the medium may be controlled using a constant angular velocity controlling method in inner and outer perimeter areas of the medium and a zone-constant linear velocity controlling method in other areas of the medium. The rotation speed of the medium may further be controlled using a constant angular velocity controlling method only in an inner area of the medium and a zone-constant linear velocity controlling method in other areas of the medium.

The medium may be parsed into the plurality of areas and the respective optimal writes speeds are determined for each of the plurality of areas. The plurality of areas may correspond to predetermined addressing zones of the medium or the plurality of areas correspond to a plurality of areas including an inner periphery medium area, an outer periphery medium area, and an area for remaining portions of the medium.

To achieve the above and/or other aspects and advantages, embodiments of the present invention include a recording and/or reproducing apparatus including a controller to determine a position of a pickup over a medium during a writing mode, obtaining a corresponding optimal write speed information based on the determined position of the pickup, with obtainable optimal write speeds having been individually assigned particularly for each of a plurality of areas of the medium, and generating a control signal based on the obtained optimal write speed to control a rotation of the medium.

The apparatus may further include a memory to store the obtainable optimal write speeds for the plurality of areas of the medium. The apparatus may still further include a servo controller to generate a spindle motor control voltage corresponding to the control signal, as a spindle motor control signal, and a driver to generate a driving current corresponding the spindle motor control voltage generated by the servo controller to drive the rotation of the medium.

The controller may measure a medium quality evaluating factor for each of the plurality of areas of the medium, analyzes the medium quality evaluating factor to determine the obtainable optimal write speeds for each of the plurality of areas of the medium.

The controller may still further measure the medium quality evaluating factor for each of the plurality of areas of the medium before executing the writing operation whenever the medium is determined to be a writable medium, upon loading of the medium. Here, the medium quality evaluating factor may be based on at least one of a magnitude of a tracking error signal, a magnitude of a focus error signal, and a variation in magnitude of a wobble signal of the medium.

If the measured medium quality evaluating factor is within upper and lower threshold values then a standard write speed, determined during a design/manufacturing stage or outside of the writing mode of the recording and/or reproducing apparatus, may be maintained as the obtained optimal write speed, if the measured medium quality evaluating factor is greater than the upper threshold value then the obtained optimal write speed in a corresponding area may be determined so as to be lower than the standard write speed, and if the measured medium quality evaluating factor is less than the lower threshold value then the obtained optimal write speed in the corresponding area may be determined so as to be greater than the standard write speed.

If the medium is a multilayer disk, the obtained optimal write speed in an area in which layer jumping is performed may be lower than a standard write speed, determined during a design/manufacturing stage or outside of the writing mode of the recording and/or reproducing apparatus, by a predetermined write speed.

If the medium is a multilayer disk, obtained optimal write speeds in innermost and outermost perimeter areas of the medium may be determined so as to be lower than a standard write speed, determined during a design/manufacturing stage or outside of the writing mode of the recording and/or reproducing apparatus, by a predetermined write speed, and obtained optimal write speeds in other areas of the medium may be optimally determined based on the medium quality evaluating factor.

To achieve the above and/or other aspects and advantages, embodiments of the present invention include a method for controlling a write speed of a recording and/or reproducing apparatus, including controlling rotation speeds of a medium at respective optimal write speeds for corresponding areas of the medium during writing to the respective corresponding areas, wherein the respective optimal write speeds are distinguishable from standard write speeds for the medium determined during a design/manufacturing stage or outside of the writing mode of the recording and/or reproducing apparatus.

The method may include measuring a disk quality evaluating factor affecting a servo control performance in the areas of the medium. The method may still include determining the respective optimal write speeds for the areas of the medium based on a measured medium quality evaluating factor for each of the areas.

The respective optimal write speeds may be determined irrespective of the standard write speeds for the medium.

The respective optical write speeds may be determinable to be greater than a corresponding standard write speed for the medium determined during the design/manufacturing stage of the recording and/or reproducing apparatus.

The respective optical write speeds may be determinable to be lower than a corresponding standard write speed, along an outer perimeter of the medium, determined during the design/manufacturing stage of the recording and/or reproducing apparatus.

The respective optical write speeds may further be determinable to be different than a corresponding standard write speed, in an area of layer change during the writing, determined during the design/manufacturing stage of the recording and/or reproducing apparatus.

The standard write speeds may also be based on predetermined estimations of potential error generating defects expected in the medium that may be avoided by the standard write speed being lower than a potential write speed that would write data to the medium without error.

To achieve the above and/or other aspects and advantages, embodiments of the present invention include at least one medium including computer readable code to implement method embodiments of the present invention.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1A:
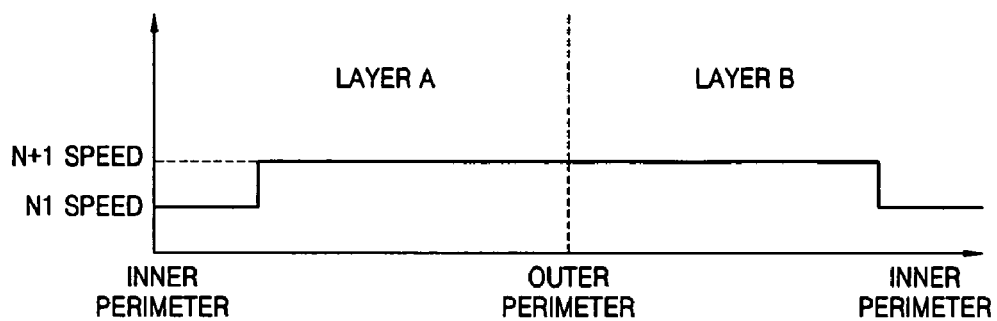
FIGS. 1A and 1B illustrate relationships between positions along a disk and write speeds according to conventional write control techniques.
Figure 1B:
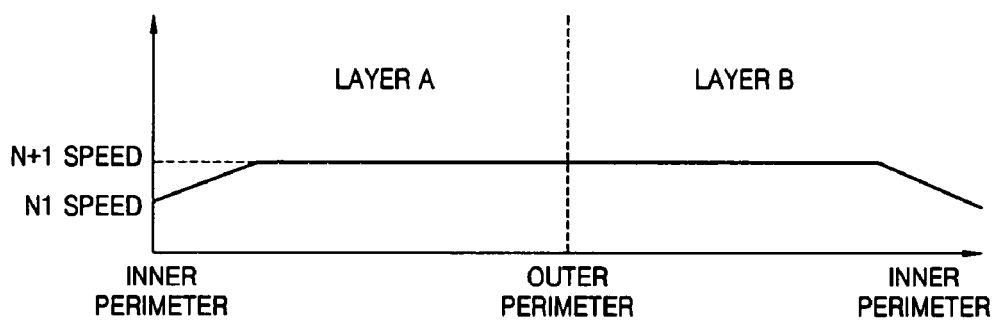

Reference will now be made in detail to embodiments, at least as described herein, of the present invention, examples of which are illustrated in the accompanying drawings, wherein like reference numerals refer to the like elements throughout. Embodiments are described below to explain the present invention by referring to the figures.

Figure 2:
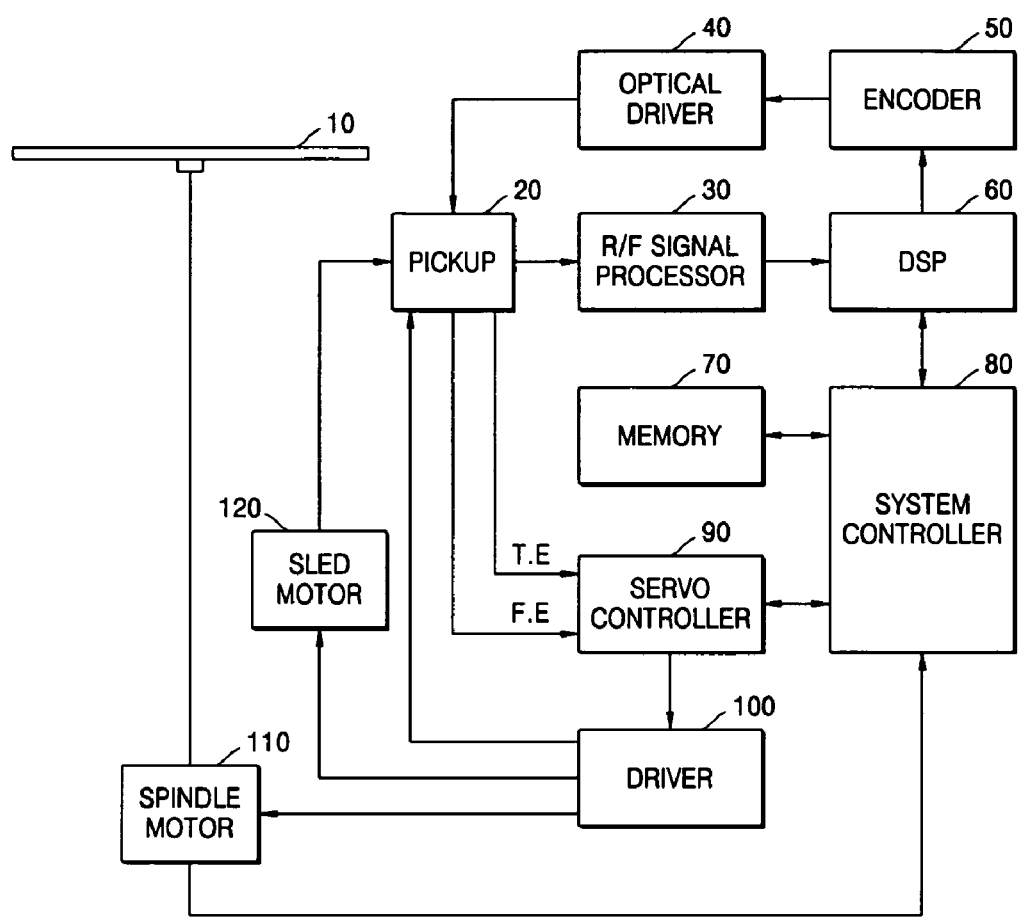
FIG. 2 illustrates an optical disk drive controlling a write speed of a disk drive, according to an embodiment of the present invention.

As shown in FIG. 2, an optical disk drive, according to an embodiment of the present invention, may include a disk 10, a pickup 20, a radio frequency (RF) signal processor 30, an optical driver 40, an encoder 50, a digital signal processor (DSP) 60, a memory 70, a system controller 80, a servo controller 90, a driver 100, a spindle motor 110, and a sled motor 120, for example.

Here, the pickup 20 may include a laser diode, a plurality of photodiodes, various types of lenses, and an actuator horizontally and/or vertically moving the lenses, and may project an optical signal on a disk and detect the optical signal reflected from the disk. In particular, the plurality of photodiodes may be combined, and signals of the plurality of photodiodes may be monitored, e.g., combined, to generate a tracking error signal TE and/or a focus error signal FE for controlling a servo and a signal used for processing a signal.

The RF signal processor 30 may shape a signal, used for processing the signal and detected by the pickup 20, converts the shaped signal into a binary signal, and outputs the binary signal to the DSP 60.

The optical driver 40 may output a light driving signal, generated from an input signal, during a writing mode and a driving signal for generating a laser power having a predetermined level, in a playback mode.

The encoder 50 re-converts data converted into a writing format by the DSP 60 into a bitstream and outputs the bitstream to the optical driver 40.

The DSP 60 may recover the original data from the binary signal input from the RF signal processor 30 using a phase locked clock, for example, and adds an error correction code (ECC) to input digital data in the writing mode to convert the input digital data into a writing format. Also, the DSP 60 may separate header information from data input from a host device (not shown) and output the header information to the system controller 80.

The servo controller 90 may generate a voltage for driving an actuator of the pickup 20 using the aforementioned tracking error signal and/or the focus error signal to horizontally and/or vertically control the pickup 20 and a voltage for driving the sled motor 120 to move the pickup 20 to a target track in a seek mode. Also, the servo controller 90 may generate a spindle motor driving voltage for driving the spindle motor 110 according to a spindle motor control signal for controlling a rotation speed of the disk 110 so as to correspond to the write speed predetermined by the system controller 80.

The driver 100 may generate driving currents for driving the spindle motor 110 and the sled motor 120 according to the driving voltages generated by the servo controller 90 and an actuator driving current of the actuator of the pickup 20 for controlling a focus and tracking of an optical lens of the pickup 20.

The memory 70 may be used to store information as to a write speed, determined with respect to areas of the disk 10, e.g., each area, by the system controller 80 whenever a writable disk 10 is loaded. The memory 70 may also store computer readable code, e.g., code and programs, and data for executing methods that will be further described with reference to FIGS. 3 and 4.

The system controller 80 may control the overall operation of the disk drive. In detail, the system controller 80 may measure a factor for evaluating a quality of multiple areas of the disk 10 whenever the writable disk 10 is loaded, analyze the measured result to determine an optimal write speed for each corresponding area of the disk 10, and store information as to the write speed in the memory 70. If a write command is input, the system controller 80 can determine the corresponding position of the disk 10 where writing is to be performed, e.g., from the header information input from the DSP 60, read information as to the write speed with respect to the determined position from the memory 70, generate the appropriate spindle motor control signal for controlling the rotation speed of the disk 10, based on the read information as to the write speed, and output the spindle motor control signal to the servo controller 90. The system controller 80 may also determine a current position of the pickup 20 over the disk 10, e.g., from a wobble signal detected from the disk 10, during writing of data.

The factor for evaluating the quality of the each area of the disk 10 that affects a servo control performance, for example, may be set according to variations in magnitudes of the tracking error signal, the focus error signal, and/or the wobble signal. However, the factor is not limited to the same.

Figure 3:
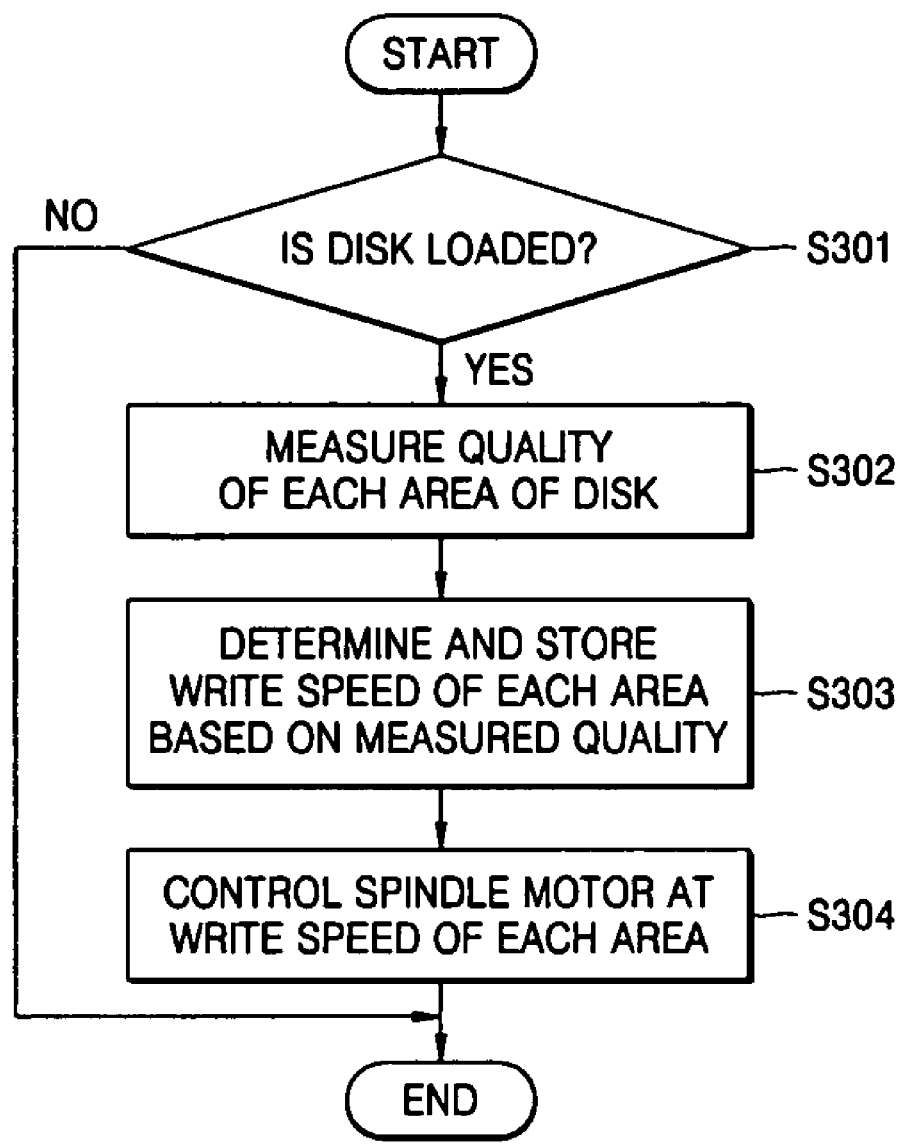
FIG. 3 illustrates a method for controlling a write speed of a disk drive, according to an embodiment of the present invention.

A method for controlling a write speed of a disk drive, according to an embodiment of the present invention, will now be further described in detail with reference to FIGS. 2 and 3.

In operation S301, the system controller 80 may determine whether a new writable disk 10 has been loaded into an optical disk drive. In detail, the system controller 80 may determine whether a new disk is loaded into drive, using a sensor (not shown) installed to sense that the disk is loaded and/or unloaded and a type of the disk, e.g., by using absolute time in pregroove (ATIP) information written in a lead-in area of the disk, noting further embodiments are equally available.

If the system controller 80 determines, in operation S301, that a writable disk 10 is loaded into the optical disk drive, the system controller 80 may measure a disk quality evaluating factor for evaluating a servo control performance of multiple areas, each of predetermined areas, of the disk 10, in operation S302. Here, the disk quality evaluating factors may be based on variations in magnitudes of a tracking error signal, a focus error signal, and/or a wobble signal or the like, for example. The disk quality evaluating factors may be used to indirectly measure the quality of a disk such as its eccentricity, bending, or the like. The variations in the magnitudes of the tracking error signal, the focus error signal, and/or the wobble signal are, typically, increased in proportion to the eccentricity, bending, or the like of the disk. Also, each area of the disk may be divided into predetermined zones. If necessary, in an embodiment of the present invention, several zones may be integrated into one area. Alternatively, each area of the disk may be assigned by dividing the disk into an inner perimeter area, an intermediate area, and an outer perimeter area, for example.

In operation S303, the system controller 80 may determine the write speed of the each area of the disk 10 based on the measured disk quality evaluating factor and store information as to the appropriate write speed in the memory 70, for example. In detail, in the method of determining the write speed of the areas, if a maximum value of the magnitude of the tracking error signal and/or the focus error signal, for example, measured with respect to the each area of the disk exceeds an upper threshold value, the write speed may be assigned to be lower than a standard write speed, e.g., as set in an initial stage, by a predetermined write speed. If the maximum value of the magnitude of the tracking error signal and/or the focus error signal, for example, is less than a lower threshold value, the write speed may be assigned to be higher than the standard write speed, e.g., by a predetermined write speed. If the maximum value of the magnitude of the tracking error signal and/or the focus error signal, for example, is between the upper and lower threshold values, an optimal write speed in a corresponding area may be assigned so as to maintain the standard write speed.

Here, it is briefly noted that the magnitudes may be representative of larger values tending toward greater potentiality of writing errors and lower values tending toward lower potentiality of writing errors, but depending on the measuring techniques the magnitudes could individually be reversely representative of such potential errors and/or eventually normalized so in all magnitudes, e.g., if combined, their overall representation will be consistent of greater or lower potentiality of errors.

Again, with this embodiment, if the variation in the magnitude of the wobble signal, for example, measured with respect to each area of the disk exceeds the upper threshold value, the write speed may be assigned to be lower than the standard write speed by a predetermined write speed for each area, for example. If the variation is less than the lower threshold value, the write speed may be assigned to be higher than the standard write speed by a predetermined write speed. According to an embodiment of the present invention, if the variation is between the upper and lower threshold values, the optimal write speed in the corresponding area may be assigned so as to maintain the standard write speed.

In addition, in view of the aforementioned discussion regarding multilayer disks, if the disk 10 is a multilayer disk, the write speed in an area, e.g., in which layer jumping is executed, may be lower than the standard write speed by a predetermined write speed regardless of the quality of the disk 10. Here, the write speed may similarly be assigned to be lower than the standard write speed based on the quality of the disk 10 in the area in which layer jumping is executed.

Further, according to an embodiment of the present invention, if the disk 10 is the multilayer disk, write speeds in innermost and outermost perimeter areas of the disk 10 may be assigned to be lower than the standard write speed, e.g., by predetermined write speeds regardless of the quality of the disk 10. Optimal write speeds in other areas of the disk 10 may be assigned based on the disk quality evaluating factors measured with respect to each area of the disk 10, for example. Here, again, the write speeds in the innermost and outermost areas of the disk 10 may also be lowered based on the standard write speed in consideration of the quality of the disk 10.

Here, the standard write speed corresponds to a maximum write speed determined during the design of a disk drive, for example. The upper and lower threshold values can be threshold values for classifying poor, normal, and good states of a quality of a disk based on an experimentally obtained variations in a tracking error signal, a focus error signal, and/or a wobble signal based on magnitudes of eccentricity and bending of the disk, e.g., also during the design of the disk drive.

In operation S304, the rotation speed of the spindle motor, in a corresponding area of the disk 10 in which writing is to be performed, may be controlled based on the assigned write speed for the each area of the disk 10, e.g., as determined in operation S303.

Figure 5A:
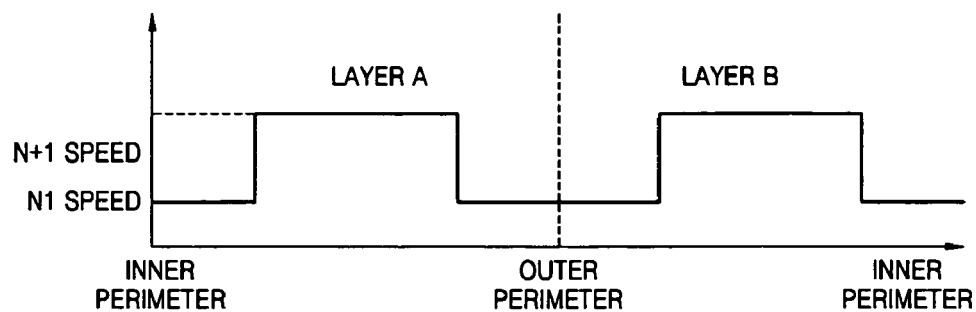
FIGS. 5A through 5D illustrate relationships between write speeds and areas of a disk, according to an embodiment of the present invention.
Figure 5B:
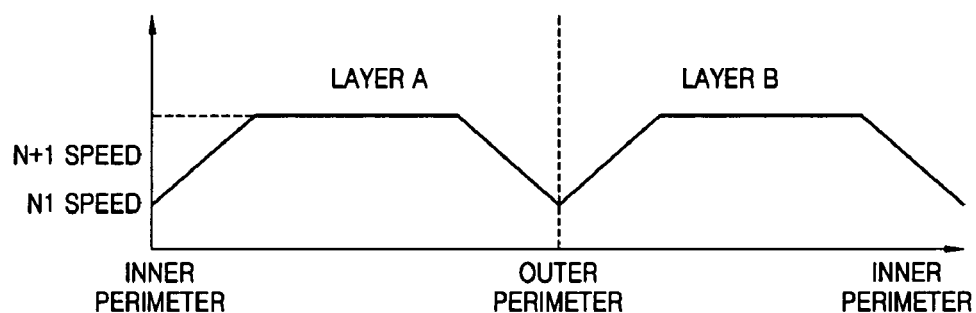
Figure 5C:
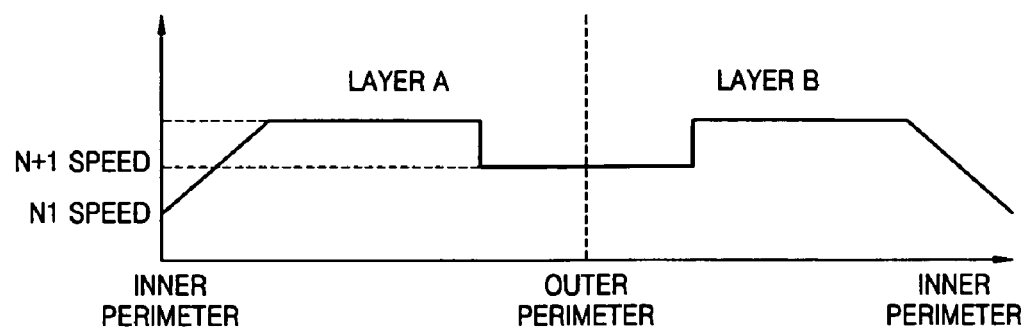
Figure 5D:
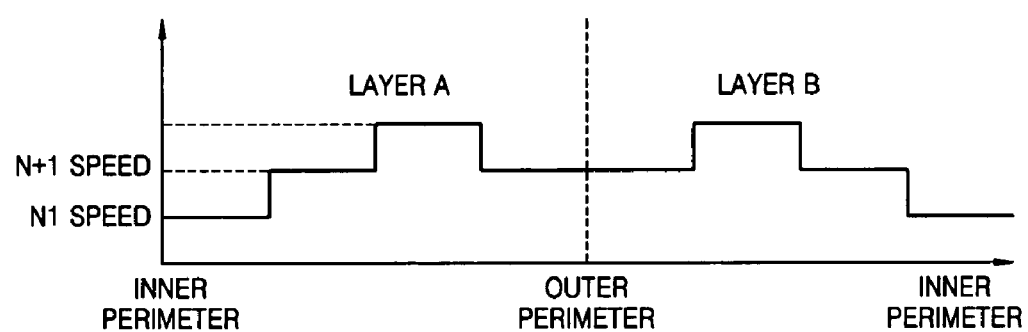

In a method of controlling a rotation speed of a spindle motor, according to an embodiment of the present invention, the rotation speed of the spindle motor may be controlled using a zone-constant linear velocity technique, according to the aforementioned assigned write speed determined with respect to each area as shown in FIGS. 5A through 5D. Here, FIG. 5A illustrates optimal write speeds in three areas of a disk, i.e., inner, intermediate, and outer areas, based on a quality of the disk, and FIG. 5D illustrates optimal write speeds in four areas of the disk based on the quality of the disk. Here, it is further noted that alternate multiple areas of the disk are equally available.

In a method of controlling a rotation speed of a spindle motor, according to another embodiment of the present invention, the rotation speed of the spindle motor may be controlled by constantly maintaining a constant angular velocity (CAV) of the spindle motor in inner and outer perimeter areas of the disk and using a zone-constant linear velocity technique in other areas of the disk as shown in FIG. 5B.

In a method of controlling a rotation speed of a spindle motor, according to still another embodiment of the present invention, the rotation speed of the spindle motor may be controlled by constantly maintaining a CAV of the spindle motor only in an inner perimeter area of a disk and using a zone-constant linear velocity technique in other areas of the disk, as shown in FIG. 5C, for example.

Figure 4:
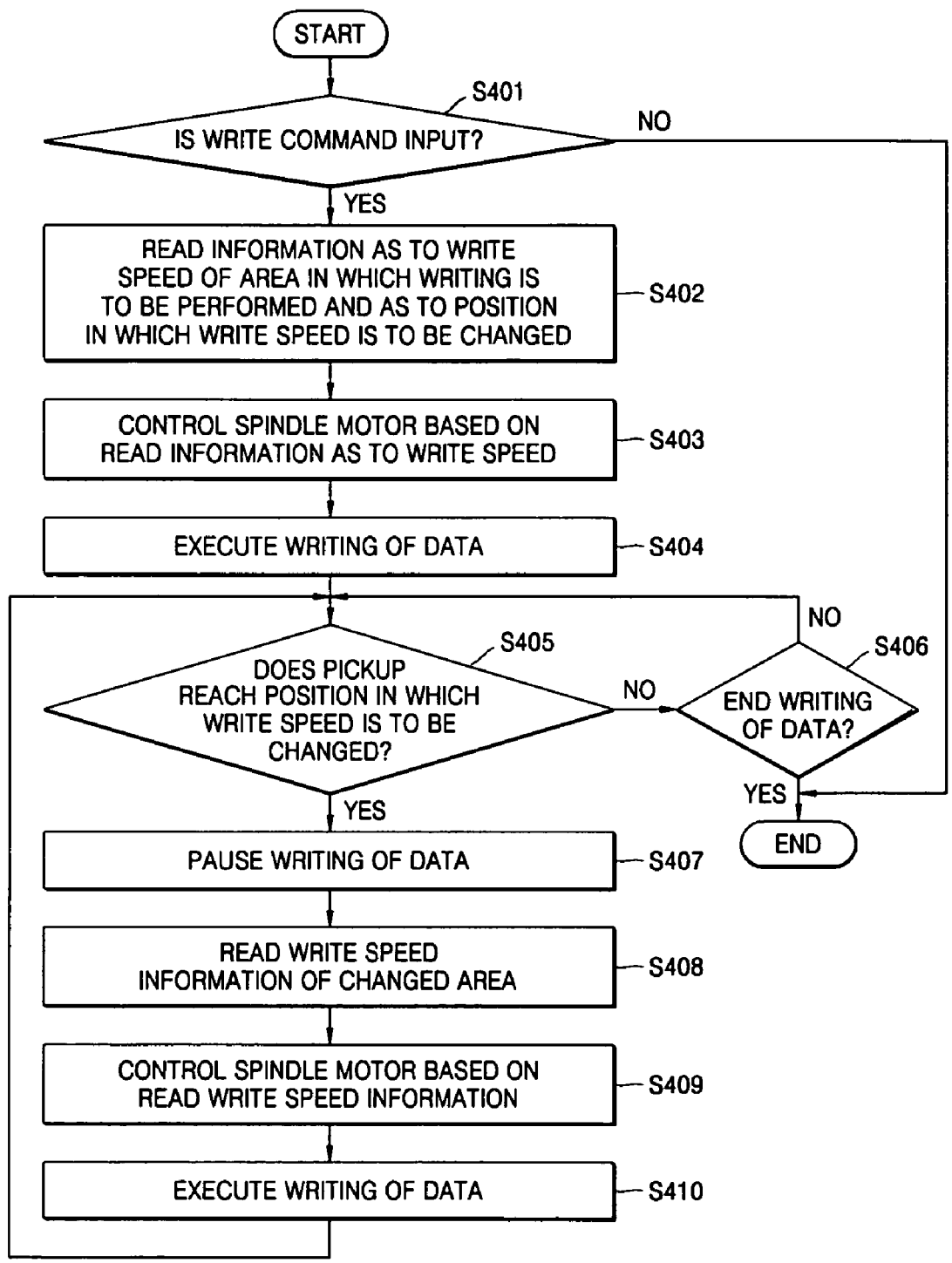
FIG. 4 illustrates a method for controlling a write speed using write speed information of multiple areas of a disk, according to an embodiment of the present invention.

Embodiments of the present invention, including a method of controlling a write speed in areas of a disk in a writing mode, using write speed information of the each area of the disk determined and stored in the memory 70, such as that described with reference to FIG. 3, will now be described in greater detail with reference to FIG. 4.

In operation S401, the system controller 80 may determine whether a write command is input from a host device (not shown).

If the system controller 80 determines, in operation S401, that the write command has been input from the host device, the system controller 80 may read from memory 70 assigned write speed information corresponding to an area of a disk in which writing is to be performed and information as to the position in which a write speed is to be changed, in operation S402. In other words, if the write command is input from the host device to the system controller 80, the system controller 80 may detect a position of the disk in which writing is to be performed, from Atip (Absolute Time in Pregroove) Min, Sec, and Form information of input header information. The system controller 70 may read from the memory 70, for example, the write speed information corresponding to the area of the disk in which writing is to start and information as to a starting position of an area in which the write speed should be changed.

In operation S403, the system controller 80 may control the spindle motor 110 so that the disk 10 rotates at a speed corresponding to the write speed information read in operation S402. In other words, if the system controller 80 generates a spindle motor control signal for rotating the disk 10 at a speed corresponding to the read write speed information, the servo controller 90 may generate a spindle motor control voltage corresponding to the spindle motor control signal, and the driver 100 may apply a driving current corresponding to the spindle motor control voltage to the spindle motor 100 to rotate the disk 10 at the desired write speed.

In operation S404, the system controller 80 may drive the spindle motor 100 at an optimal write speed in an area in which writing is to be performed and execute writing of data.

In operation S405, the system controller 80 may detect the position of the pickup 20 on the disk 10, e.g., using a wobble signal, and determine when the pickup 20 reaches a position in which the write speed is to be changed.

If the system controller 80 determines, in operation S405, that the pickup 20 does not reach the position in which the write speed is to be changed, the system controller 80 may determine whether the writing of data has been completed, in operation S406.

If the system controller 80 determines in operation S406 that the writing of data has been completed, the system controller 80 may end the writing of data. If not, the system controller 80 may return to operation S405 with further executing of the writing of data.

If the system controller 80 determines, in operation S405, that the pickup 20 reaches the position in which the write speed is to be changed, the system controller 80 pauses the writing of data process in operation S407.

In operation S408, the system controller 80 may read from memory 70 write speed information of an area of the disk 10 in which the write speed is to be changed.

In operation S409, the system controller 80 may further control the spindle motor 110 so as to rotate the disk 10 at a speed corresponding to the write speed information read in operation S407.

Further, in operation S410, the system controller 80 may re-execute the writing of data and return to operation S405, for example.

As a result, according to an embodiment of the present invention, an optical write speed of areas of a disk can be maintained based on a writing position of the disk and in consideration of a quality state of the each area of the disk.

As described above, according to embodiments of the present invention, at least as described herein, the write speed can be adaptively varied based on a writing position of a disk and in consideration of a quality state of each area of a disk loaded into a disk drive. Thus, the writing quality of the disk drive can be improved without a great change in the writing time of the disk. In addition, according to embodiments of the present invention, a write speed in a high quality area of the disk may be higher than a predetermined maximum write speed set during the designing stage for the disk drive. Thus, although the write speed may be slightly lowered based on the quality of the disk in inner and outer perimeter areas of the disk, the whole writing time of the disk is not greatly changed. Further, when a recording medium is a multilayer disk, the writing quality of a layer jumping area can also be greatly improved.

Embodiments of the present invention may be implemented at least as a method, apparatus, and system. When the present invention is implemented as computer readable code in a medium, e.g., as code or software, or as component elements being code segments that execute differing operations, such computer readable code can be stored in a medium, e.g., a processor readable media. The medium may be any medium that can store data. Examples of such media include electronic circuits, semiconductor memory devices, ROMs, flash memories, erasable ROMs (EROMs), floppy disks, optical disks, hard disks, optical fiber, radio frequency (RF) networks, etc, for example.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for controlling a write speed of a recording and/or reproducing apparatus, comprising:

measuring a medium quality evaluating factor affecting a servo control performance in a plurality of areas of a medium;

determining respective optimal write speeds for the plurality of areas of the medium based on a respective medium quality evaluating factor;

storing the respective optimal write speeds for the plurality of areas of the medium in a memory; and controlling, in a writing mode, a rotation speed of the medium at an optimal write speed, from the determined optimal write speeds read from the memory, for a corresponding area of the medium, of the plurality of areas, to which writing is to be performed wherein if the medium is a multilayer disk, corresponding optimal write speeds for innermost and outermost perimeter areas of the medium are determined so as to be lower than a standard write speed, determined during a design/manufacturing stage or outside of the writing mode of the recording and/or reproducing apparatus, by a predetermined write speed, and corresponding optimal write speeds in other areas of the disk are optimally determined based on the medium quality evaluating factor.

2. The method of claim 1, wherein the respective optimal write speeds are determinable to be greater than a corresponding standard write speed for the medium determined during a design/manufacturing stage or outside of the writing mode of the recording and/or reproducing apparatus.

3. The method of claim 1, wherein the respective optimal write speeds are determinable to be lower than a corresponding standard write speed, along an outer perimeter of the medium, with the standard write speed being determined during a design/manufacturing stage or outside of the writing mode of the recording and/or reproducing apparatus.

4. The method of claim 1, wherein the respective optimal write speeds are determinable to be different than a corresponding standard write speed, in an area of layer change during the writing mode, with the standard write speed being determined during a design/manufacturing stage or outside of the writing mode of the recording and/or reproducing apparatus.

5. The method of claim 1, wherein the medium quality evaluating factor is based on at least one of a magnitude of a tracking error signal, a magnitude of a focus error signal, and a variation in a magnitude of a wobble signal.

6. The method of claim 1, wherein if a measured value of the medium quality evaluating factor is within upper and lower threshold values, a standard write speed, determined during a design/manufacturing stage or outside of the writing mode of the recording and/or reproducing apparatus, is maintained as a corresponding optimal write speed, if the measured value of the medium quality evaluating factor is above the upper threshold value then the optimal write speed in the corresponding area is determined so as to be lower than the standard write speed, and if the measured value of the medium quality evaluating factor is lower than the lower threshold value then the optimal write speed in the corresponding area is determined so as to be greater than the standard write speed,
wherein the measured value of the medium quality evaluating factor is representative of larger values tending toward greater potentiality of writing errors and lower values tending toward lower potentiality of writing errors.

7. The method of claim 1, wherein, if a measured value of the medium quality evaluating factor is within upper and lower threshold values, a standard write speed, determined during a design/manufacturing stage or outside of the writing mode of the recording and/or reproducing apparatus, is maintained as a corresponding optimal write speed, if the measured value of the medium quality evaluating factor is above the upper threshold value then the optimal write speed in the corresponding area is determined so as to be higher than the standard write speed, and if the measured value of the medium quality evaluating factor is lower than the lower threshold value then the optimal write speed in the corresponding area is determined so as to be lower than the standard write speed,
wherein the measured value of the medium quality evaluating factor is representative of larger values tending toward lower potentiality of writing errors and lower values tending toward greater potentiality of writing errors.

8. The method of claim 1, wherein if the medium is a multilayer disk, a corresponding optical write speed in an area in which layer jumping is executed is determined so as to be lower than a standard write speed, determined during a design/manufacturing stage or outside of the writing mode of the recording and/or reproducing apparatus, by a predetermined write speed.

9. The method of claim 1, wherein the rotation speed of the medium is controlled using a zone-constant linear velocity controlling method.

10. The method of claim 1, wherein the rotation speed of the medium is controlled using a constant angular velocity controlling method in inner and outer perimeter areas of the medium and a zone-constant linear velocity controlling method in other areas of the medium.

11. The method of claim 1, wherein the rotation speed of the medium is controlled using a constant angular velocity controlling method only in an inner area of the medium and a zone-constant linear velocity controlling method in other areas of the medium.

12. The method of claim 1, wherein the medium is parsed into the plurality of areas and the respective optimal write speeds are determined for each of the plurality of areas.

13. The method of claim 1, wherein the plurality of areas correspond to predetermined addressing zones of the medium or the plurality of areas correspond to a plurality of areas including an inner periphery medium area, an outer periphery medium area, and an area for remaining portions of the medium.

14. At least one non-transitory computer-readable medium comprising computer readable code to implement the method of claim 1.

15. A recording and/or reproducing apparatus comprising:
a controller to determine a position of a pickup over a medium during a writing mode, obtain a corresponding optimal write speed information stored in a memory based on the determined position of the pickup, with obtainable optimal write speeds having been individually assigned particularly for each of a plurality of areas of the medium and stored in the memory, and generate a control signal based on the obtained optimal write speed read from the memory to control a rotation of the medium,
wherein the controller measures a medium quality evaluating factor for each of the plurality of areas of the medium, analyzes the medium quality evaluating factor to determine the obtainable optimal write speeds for each of the plurality of areas of the medium, and
wherein if the medium is a multilayer disk, obtained optimal write speeds in innermost and outermost perimeter areas of the medium are determined so as to be lower than a standard write speed, determined during a design/manufacturing stage or outside of the writing mode of the recording and/or reproducing apparatus, by a predetermined write speed, and obtained optimal write speeds in other areas of the medium are optimally determined based on the medium quality evaluating factor.

16. The apparatus of claim 15, further comprising:
a servo controller to generate a spindle motor control voltage corresponding to the control signal, as a spindle motor control signal; and
a driver to generate a driving current corresponding the spindle motor control voltage generated by the servo controller to drive the rotation of the medium.

17. The apparatus of claim 15, wherein the controller measures the medium quality evaluating factor for each of the plurality of areas of the medium before executing the writing operation whenever the medium is determined to be a writable medium, upon loading of the medium.

18. The apparatus of claim 15, wherein the medium quality evaluating factor is based on at least one of a magnitude of a tracking error signal, a magnitude of a focus error signal, and a variation in magnitude of a wobble signal of the medium.

19. The apparatus of claim 15, wherein if the measured medium quality evaluating factor is within upper and lower threshold values then a standard write speed, determined during a design/manufacturing stage or outside of the writing mode of the recording and/or reproducing apparatus, is maintained as the obtained optimal write speed, if the measured medium quality evaluating factor is greater than the upper threshold value then the obtained optimal write speed in a corresponding area is determined so as to be lower than the standard write speed, and if the measured medium quality evaluating factor is less than the lower threshold value then the obtained optimal write speed in the corresponding area is determined so as to be greater than the standard write speed.

20. The apparatus of claim 15, wherein if the medium is a multilayer disk, the obtained optimal write speed in an area in which layer jumping is performed is lower than a standard write speed, determined during a design/manufacturing stage or outside of the writing mode of the recording and/or reproducing apparatus, by a predetermined write speed.

21. A method for controlling a write speed of a recording and/or reproducing apparatus, comprising:
  determining optimal write speeds for a plurality of areas on a medium;
  storing the optimal write speeds in a memory; and
  controlling rotation speeds of a medium at respective optimal write speeds for corresponding areas of the medium during writing to the respective corresponding areas, based on the optimal write speeds read from the memory;
  wherein the respective optimal write speeds are distinguishable from standard write speeds for the medium determined during a design/manufacturing stage or outside of the writing mode of the recording and/or reproducing apparatus and
  wherein if the medium is a multilayer disk, corresponding optimal write speeds for innermost and outermost perimeter areas of the medium are determined so as to be lower than the standard write speed, by a predetermined write speed, and corresponding optimal write speeds in other areas of the disk are optimally determined based on the medium quality evaluating factor.

22. The method of claim 21, further comprising measuring a disk quality evaluating factor affecting a servo control performance in the areas of the medium.

23. The method of claim 21, further comprising determining the respective optimal write speeds for the areas of the medium based on a measured medium quality evaluating factor for each of the areas.

24. The method of claim 21, wherein the respective optimal write speeds are determinable to be greater than a corresponding standard write speed for the medium determined during the design/manufacturing stage of the recording and/or reproducing apparatus.

25. The method of claim 21, wherein the respective optimal write speeds are determinable to be lower than a corresponding standard write speed, along an outer perimeter of the medium, determined during the design/manufacturing stage of the recording and/or reproducing apparatus.

26. The method of claim 21, wherein the respective optimal write speeds are determinable to be different than a corresponding standard write speed, in an area of layer change during the writing, determined during the design/manufacturing stage of the recording and/or reproducing apparatus.

27. The method of claim 21, wherein the standard write speeds are based on predetermined estimations of potential error generating defects expected in the medium that may be avoided by the standard write speed being lower than a potential write speed that would write data to the medium without error.

28. At least one non-transitory computer-readable medium comprising computer readable code to implement the method of claim 21.

* * * * *